March 30, 1937.  J. N. ALEXANDER  2,075,329

SAW

Original Filed July 21, 1933

Inventor

JAMES N. ALEXANDER

By Semmes & Semmes

Attorneys

Patented Mar. 30, 1937

2,075,329

UNITED STATES PATENT OFFICE 2,075,329

SAW

James N. Alexander, Birmingham, Ala.

Application July 21, 1933, Serial No. 681,633
Renewed June 18, 1935

3 Claims. (Cl. 145—35)

This invention relates to saws, and more particularly has reference to a lubricating device therefor.

As is well known, it is necessary, at least preferable, that saws be lubricated during any extended sawing operation. Such lubrication resides in supplying an oil or other suitable lubricant to the working surface of a saw blade. Heretofore this was usually effected by manual application of the lubricant to the blade, and usually necessitated a withdrawal of the blade from the work-piece, and the squirting of oil or application of grease to the blade. Obviously this interrupts the sawing operation, and is uneconomical. Furthermore, inasmuch as the sawing must be interrupted, there is always the danger that a careless workman will not sufficiently lubricate the saw.

An object of my invention is to overcome the above difficulties.

Another object of my invention is to provide a more or less automatic lubricating device for a saw.

Yet another object of my invention is to provide a device for lubricating a saw that is operable while the saw is in actual use.

To accomplish the above, and other important objects as will hereinafter appear, my invention embraces a device whereby oil is supplied to the working portion of a saw blade at any time desired by the operator, and without the necessity of stopping the sawing operation.

In order to afford a better comprehension of my invention, there is depicted in the accompanying drawing one embodiment, it being understood, of course, that various modifications may be made therein without exceeding the scope of my invention. In the accompanying drawing, in which corresponding numerals refer to the same parts:

Figure 2:
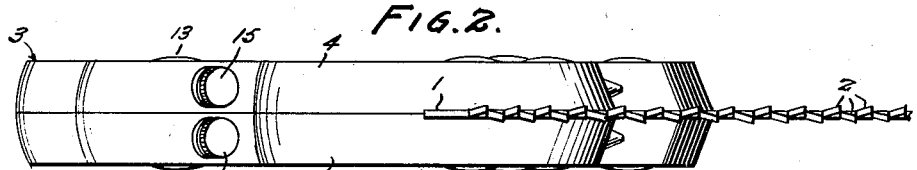
Figure 2 is a bottom plan view of a portion of the saw shown in Figure 1.

Referring more particularly to the drawing, the numeral 1 designates a saw blade provided with the usual set of teeth 2. A handle designated generally 3 is preferably made up of two sections 4 and 5, as shown in Figure 2. Although not essential, I have found it advisable to have this handle made of aluminum in order to facilitate construction of the parts, assembly, and general durability.

Figure 4:
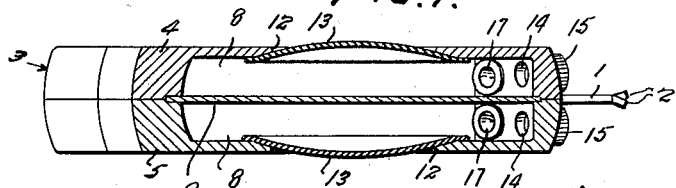
Figure 4 is a sectional view along the line 4—4 of Figure 2, looking in the direction of the arrows.

Each section is made up of a saw engaging part 6 and a handle portion 7. As best shown in Figure 4, each handle portion is provided with an interior recess or cavity 8 in order to form a chamber within the handle. In assembling my handle, I insert a plate 9 to divide the cavities 8 into separate chambers. The handle 3 is maintained in assembled position by means of bolts and screws 11 which pass through the respective sections and through the blade 1.

The side wall of each cavity 8 is cut out, preferably in elliptical shape, as shown at 12 of Figure 4. There is inserted in this cut out portion, in order to effectively close the same, a piece of flexible material 13, such as light metal, or in certain instances, it may take the form of rubber or a fabric composition. The member 13 is secured to the inner side of the cavity in a fluid-tight fit by means of solder, or some other adhesive material. Under certain circumstances, rivets or bolts may be substituted for the solder, or may supplement the solder.

An inlet to each chamber is provided in the base as indicated at 14, and a suitable screw-plug 15 is provided therefor. A discharge opening 16 is also provided near the base of the chamber, and there is adapted to fit within such discharge opening a flip valve 17. This valve should be so constructed as to remain closed until pressure is exerted in excess of that which normally results from the hydrostatic head of the liquid within the chamber 8. In other words, it serves to prevent escape of liquid from the chamber 8 under normal conditions, and only permits a discharge when an added pressure is supplied. Such an added pressure results upon flexure of the member 13 which exerts a pressure upon the liquid or upon the air space thereabove.

Figure 1:
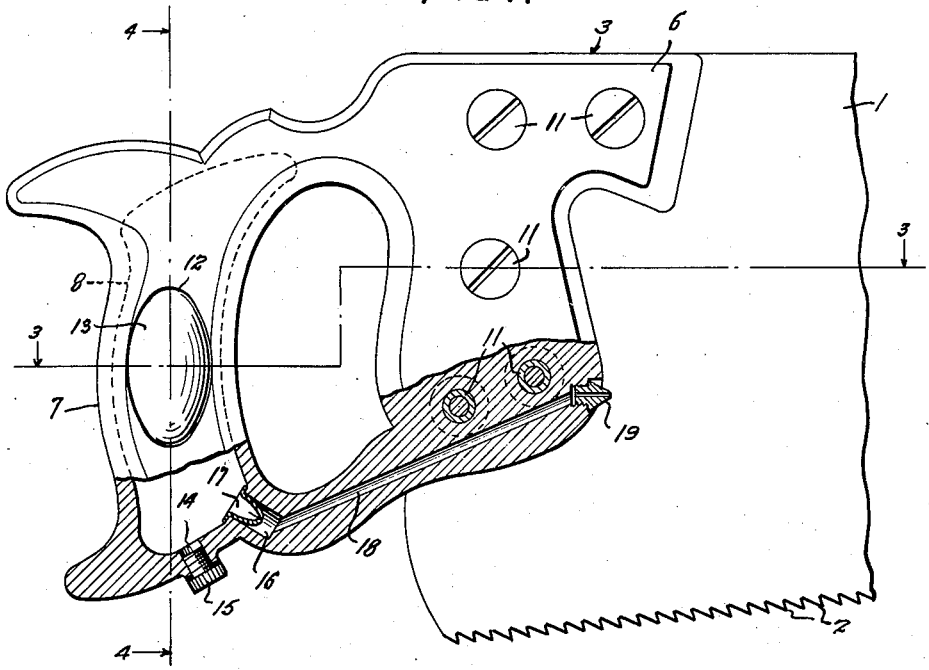
Figure 1 is a view partly in elevation and partly in section of the saw handle and the adjacent part of the saw blade.

Flip valve 17 is the rubber valve whose configuration is shown in cross-section in Fig. 1 This rubber valve is of nipple shape, the tip of the nipple being split as indicated in Fig. 1. See the line of the split in the cross-section of the flip valve 17. The rubber material gives at the teat. The split opens when the pressure pump is high enough to distort the rubber at the teat. The rubber is ordinarily sufficiently resistant to withstand the weight of the column of liquid in the reservoir 9 without permitting the split in the teat to open. Such valves are true pressure valves, and are of very simple construction.

Figure 3:
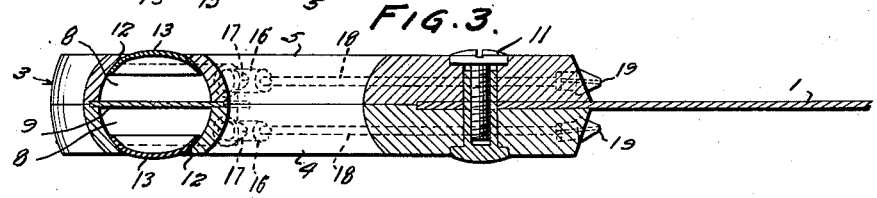
Figure 3 is a sectional view along the line 3—3 of Figure 1, looking in the direction of the arrows.

The discharge outlet 16 is connected to a conduit 18 which runs to the forward part of the saw handle 3. A suitable nozzle 19 is screw-threaded into the forward end of conduit 18, and as is clearly shown in Figure 3 the nozzle 19 is arranged at a slight angle to the vertical plane of the conduit 18 in order to direct any liquid upon the saw blade. It will be observed that this angle is such that the liquid would impinge upon the blade at a considerable distance in advance of the saw handle 3, and well out upon the working surface of the saw blade.

It is, of course, obvious that the two reservoirs, and two sections of the saw handle, are identical in construction and operation. While I have shown the provision of a dividing plate 9 in order to form two separate reservoirs 8 within the handle, it will be appreciated that under certain circumstances this plate may be omitted and a single chamber 8 provided with two discharge openings 16. In such event, a single inlet 14 may be employed in lieu of the two inlets shown in the accompanying drawing. Furthermore, in such event, a single flexure member 13 might be used instead of two separate members.

The operation of my device is believed to be apparent from the foregoing. Initially, the saw is inverted from its normal position, the plugs 15 removed and the chambers 8 filled, or substantially filled, with the lubricant. The saw may then be returned to its normal position and either put away until such time as it may be needed, or immediately used for the purpose of sawing a piece of lumber. As heretofore pointed out, the valve 17 prevents the escape of any lubricant from the chambers 8 until such time as desired.

When it is desired to lubricate the saw, either one or both of the flexible members 13 are compressed and the additional pressure exerted upon the body of oil, and upon any air in the chamber, forces the opening of the valve 17 and the oil is forced through the conduit 18 and discharged through the nozzle 19. As pointed out, the nozzles 19 are so positioned that they direct the oil upon the working surface area of the blade, and the passage of the saw through the wood serves to spread such oil throughout the entirety of the working surface.

It will, of course, be appreciated that this lubrication of the saw may be effected prior to the use of the saw or during an actual sawing operation. If the latter, the sawing may be continued without any interruption. The locations of the flexible members 13 are such that they are operated merely by increasing the strength of the grip upon the handle, and the provision of such positive means for the expulsion of the oil from the chamber insures that the oil will impinge upon the blade well in advance of the saw handle and on the working surface. This constitutes a distinct advantage over a device in which the oil might merely drip from the nozzle 19, which would require a manual spreading of the oil over the working area. As just stated, the working area is effectively lubricated by merely the passage of the saw through a piece of wood.

While I have shown in the accompanying drawing, and described in this specification, one embodiment of my invention, it will be appreciated that various modifications may be made in the specific construction without departing from my inventive concept. The scope of my invention is to be determined merely by the breadth of the appended claims.

I claim:—

1. A saw comprising a blade, a handle therefor, a divided reservoir in the handle, each portion of the divided reservoir having a flexible covering at the side only of the handle, said flexible coverings being substantially flush with the surface of the handle and adapted to lie under the hand of the worker in normal operation of the saw, conduits for each of the separate reservoirs, and pressure valves for each conduit whereby the user of the saw may operate on each flexible covering in turn to lubricate each face of the saw successively.

2. A saw comprising a blade, a handle therefor having a grip portion, means mounted in the handle for holding a lubricant, and separate means for each face of the blade operable from the side only of the handle and having an operating surface which lies substantially flush with the side of the grip portion of the saw handle for permitting ejection of said lubricant on its own face of the blade only.

3. A saw comprising a blade, a handle therefor upon which the blade is mounted, said handle having a grip portion, separate lubricant containing means mounted in the handle for holding lubricant for each respective face of the blade, and a flexible covering for each means lying substantially flush with the side of the grip portion of the handle.

JAMES N. ALEXANDER.